Dec. 30, 1924.
R. DE BRUYN
1,521,280
ROTARY CONVERTER
Filed Feb. 24, 1921
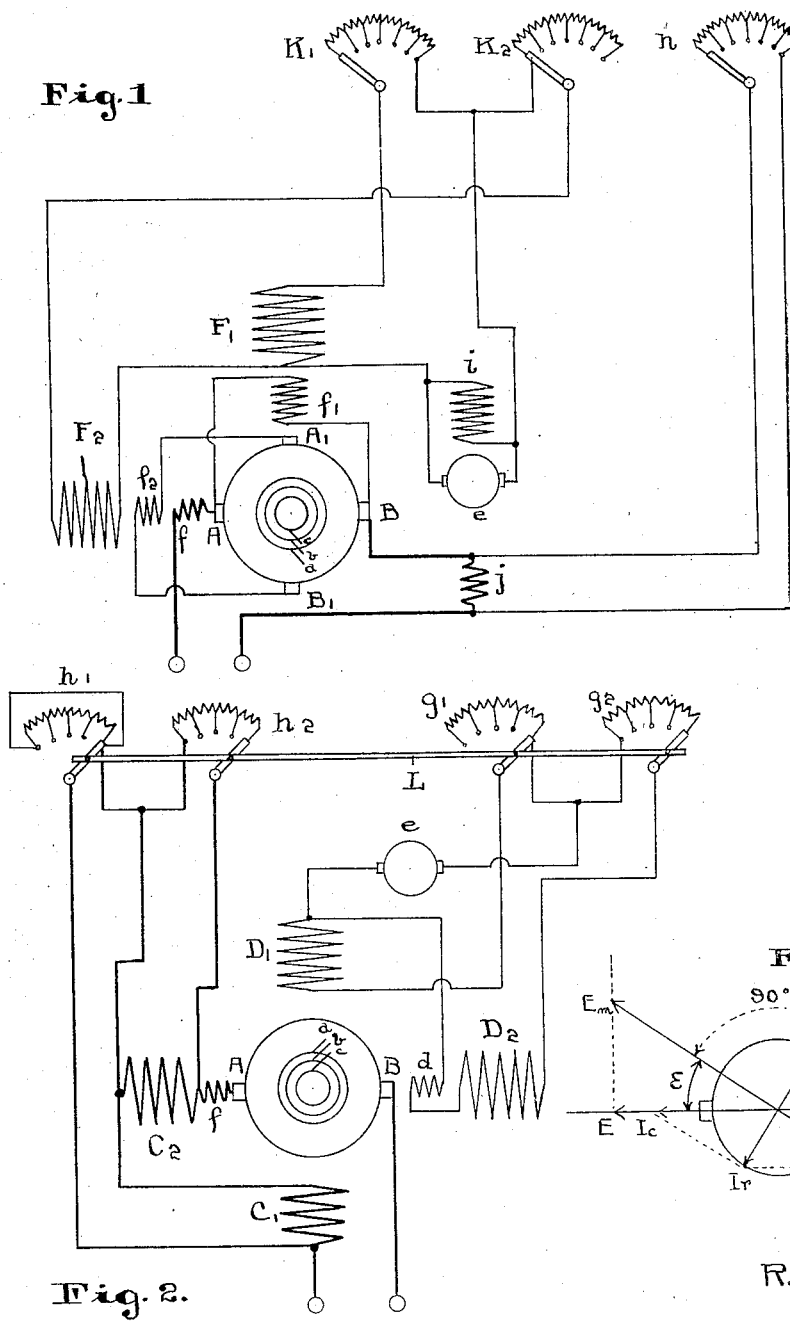
Inventor
R. de Bruyn
Marks+Clerk
By
Attorney Patented Dec. 30, 1924.

1,521,280

UNITED STATES PATENT OFFICE.

RENÉ DE BRUYN, OF MONT-SUR-MARCHIENNE, BELGIUM.

ROTARY CONVERTER.

Application filed February 24, 1921. Serial No. 447,575.

*To all whom it may concern:*

Be it known that I, RENÉ DE BRUYN, a subject of the Kingdom of Belgium, residing 23, Rue de la Chapelle-Beausart, Mont-sur-Marchienne, Belgium, have invented certain new and useful Improvements in Rotary Converters, of which the following is a specification.

Rotary converters are generally considered as machines with constant tension, and in order to vary the ratio between the alternating electromotive force and the continuous electromotive force, it has already been proposed to employ two field systems, lagging 90° one behind the other, each comprising a shunt winding and a series winding, in combination with commutation windings.

The main object of the present invention consists in providing a rotary with variable tension, of the above mentioned type, but comprising a smaller number of windings than heretofore.

Besides, in rotary converters actually in use, the excitation is generally varied by means of separate resistances, and another object of the invention consists in providing means by which the variable ratio between the alternating and the continuous electromotive forces is obtained by a single, combined operation of the adjusting resistances.

In the annexed drawings:

Fig. 1 is a diagram of a field arrangement according to the invention;

Fig. 2 is a diagram of an arrangement of two field systems shown for explaining the operation of the machine of Fig. 1;

Fig. 3 is a vectorial representation of the electromotive forces and of the fields of the machine.

Referring first to Fig. 2, in which A and B are the two continuous current brushes, $a$, $b$ and $c$ the brushes for carrying the alternating current, the two sets of field coils comprise, one the shunt winding $D_1$ and the series winding $C_1$, the other the shunt winding $D_2$ and the series winding $C_2$; $d$ is a shunt commutation winding, $f$ a series commutation winding, $e$ an independent source feeding windings $D_1$ and $D_2$, and $g_1$, $g_2$, and $h_1$, $h_2$, adjusting resistances for the shunt and series excitations respectively.

It is known that when running idle the fields $H_1$ and $H_2$, due to windings $D_1$ and $D_2$, are combined in order to give a resulting field $H$ inducing in the machine an electromotive force which is equal to the alternating tension applied.

Between $H$, $H_1$ and $H_2$, the relation is as follows:

$$H = \sqrt{H_1^2 + H_2^2}$$

the electromotive force between the brushes being proportional to $H_1$. Said tension will be nought for $H_1 = 0$ and maximal for $H_1 = H$.

Assuming that $E_m$ be the maximal tension, the tension $E$, for a certain adjustment, will be $$E = E_m \times \frac{H_1}{H}$$

Assuming that when running idle the excitations be regulated for obtaining a tension $E$, whilst the maximal tension is $E_m$; then the vector $E_m$ of the maximal tension will be at an angle $\varepsilon$ of the brush line, so that cos $$\varepsilon = \frac{E}{E_m}.$$

If $I_c$ be the vector representing the field due to the continuous current in the armature, the field due to the alternating current will have a watt component $I_w$ directed in opposite sense to vector $E_m$ and the value of which is $I_w = I_c \cos \varepsilon$.

Said relation results from the fact that the watt power absorbed as alternating current is equal, the losses being excepted, to the power delivered as continuous current.

Assuming that the excitations be so adjusted that the machine absorbs no wattless current, the fields induced in the machine will comprise field $I_c$ due to the continuous current, and field $I_w$ due to the absorbed alternating current.

The resultant $I_r$ of said field has a value $I_r = I_c \sin \varepsilon$, and is directed at right angles to vector $E_m$ of the induced tension.

Whether the converter delivers or absorbs continuous current, said resultant is taken from or added to the resultant of the fields due to coils $D_1$ and $D_2$.

Thus in order to maintain under load the tension $E$, existing initially between brushes when running idle, it is necessary that the resultant of the fields due to $D_1$ and $D_2$ be increased or reduced proportionally to vector $I_r$. It is for that reason that the machine, subject matter of the invention, comprises two coils $C_1$ and $C_2$ energized in series by the principal current, and the ampere-turns of which can be regulated by means of resistances $h_1$ and $h_2$ mounted in shunt.

From the above it will be seen that the resistances must be so adjusted that $D_1$ be proportional ($\equiv$) to $H \cos \epsilon$
$D_2 \equiv H \sin \epsilon$
$C_1 \equiv I_r \cos \epsilon = I_c \sin \epsilon \cos \epsilon$
$C_2 \equiv I_r \sin \epsilon = I_c \sin^2 \epsilon$.

Referring now to the arrangement shown in Fig. 1, in which the continuous current brushes are still designated by A, B, and the alternating brushes by $a, b, c$, but where, according to the invention, windings $D_1$ and $C_1$, are combined into one single coil $F_1$, and coils $D_2$ and $C_2$ are combined into a single coil $F_2$, situated at 90° of the first coil, both coils being connected with the terminals of a compound exciter $e$ having a shunt excitation $i$ and a series excitation $j$ traversed by the commutation current. The regulation is effected by means of two resistances $K_1$ and $K_2$ and shunt $h$.

The machine comprises one line of supplementary brushes $A_1B_1$ at 90° of the brush line A.B. The tension between the brushes $A_1$ and $B_1$ on the one hand, and A and B on the other hand, excites the commutation coils $f_1$ and $f_2$, which eliminate the field in the commutation zones; the winding $f$ is maintained for the same purpose as before.

From the above it will be seen that $F_1 = D_1 + C_1 \equiv H \cos \epsilon + I_c \sin \epsilon \cos \epsilon$
$F_2 = D_2 + C_2 \equiv H \sin \epsilon + I_c \sin^2 \epsilon$
or also
$F_1 \equiv \cos \epsilon (H + I_c \sin \epsilon)$
$F_2 \equiv \sin \epsilon (H + I_c \sin \epsilon)$.

The tension $c$ at the compound exciter terminals can be formed of two components such that $$e \equiv (H + KI_c),$$

so that it will only be necessary to adjust resistance $h$ so that the component $K I_c$ varies proportionally to $I_c \sin \epsilon$, and simultaneously the resistances $K_1$ and $K_2$, so that the excitations $F_1$ and $F_2$ vary respectively as $\cos \epsilon$ and $\sin \epsilon$.

It is clear that in the arrangement shown in Fig. 2, the handles of the four resistances may also be mechanically connected, (L) in which case the resistance $C_2$ will be shunted.

What I claim is:

1. In a rotary converter, the combination with a revolving member having slip rings, a commutator and brushes on the said commutator, a stationary member having a field winding at right angles from the brush line, and connected with the terminals of a compound exciter, a second field winding arranged coaxially with the brush line, and also connected with the terminals of the said compound exciter, means for adjusting the ampereturns of said field windings, and means for varying the ampereturns of the series excitation of the compound exciter.

2. In a rotary converter, the combination with a rotary member having slip rings, a commutator and brushes on said commutator, a stationary member having a field winding arranged at right angles from the brush line, and connected with the terminals of a compound exciter, a second field winding arranged coaxially with the brush line, and also connected with the terminals of the compound exciter, the series excitation of the latter being fed by the current of the converting machine, and means for varying the ampereturns of the field windings and of the series winding of the exciter.

3. In a rotary converter, the combination with a revolving member having slip rings, a commutator and main brushes on said commutator, a stationary member having a field winding arranged at right angles from the brush line, and connected with the terminals of a compound exciter, a second field winding arranged coaxially with the brush line and also connected with the terminals of the compound exciter, auxiliary brushes situated at right angles from the main brushes, a commutation winding in shunt on the main brushes and a commutation winding in shunt on the auxiliary brushes.

4. In a rotary converter, the combination with a rotary member having slip rings, a commutator, and main brushes on said commutator, a stationary member having a field winding arranged at right angles from the brush line, and connected with the terminals of a compound exciter, a second field winding, arranged coaxially with the brush line, and also connected with the terminals of a compound exciter, auxiliary brushes situated at right angles from the main brushes, a commutation winding in shunt on the main brushes, a commutation winding in shunt on the auxiliary brushes, and a series commutation winding coaxial with the main brushes.

In testimony whereof I have signed my name to this specification.

RENÉ DE BRUYN.

Witness:
RENE P. WITHBOLLY.